March 29, 1949.  G. R. C. MARTINSSON  2,465,692
AUTO-FOCUS PHOTOGRAPHIC ENLARGING APPARATUS
Filed July 11, 1946
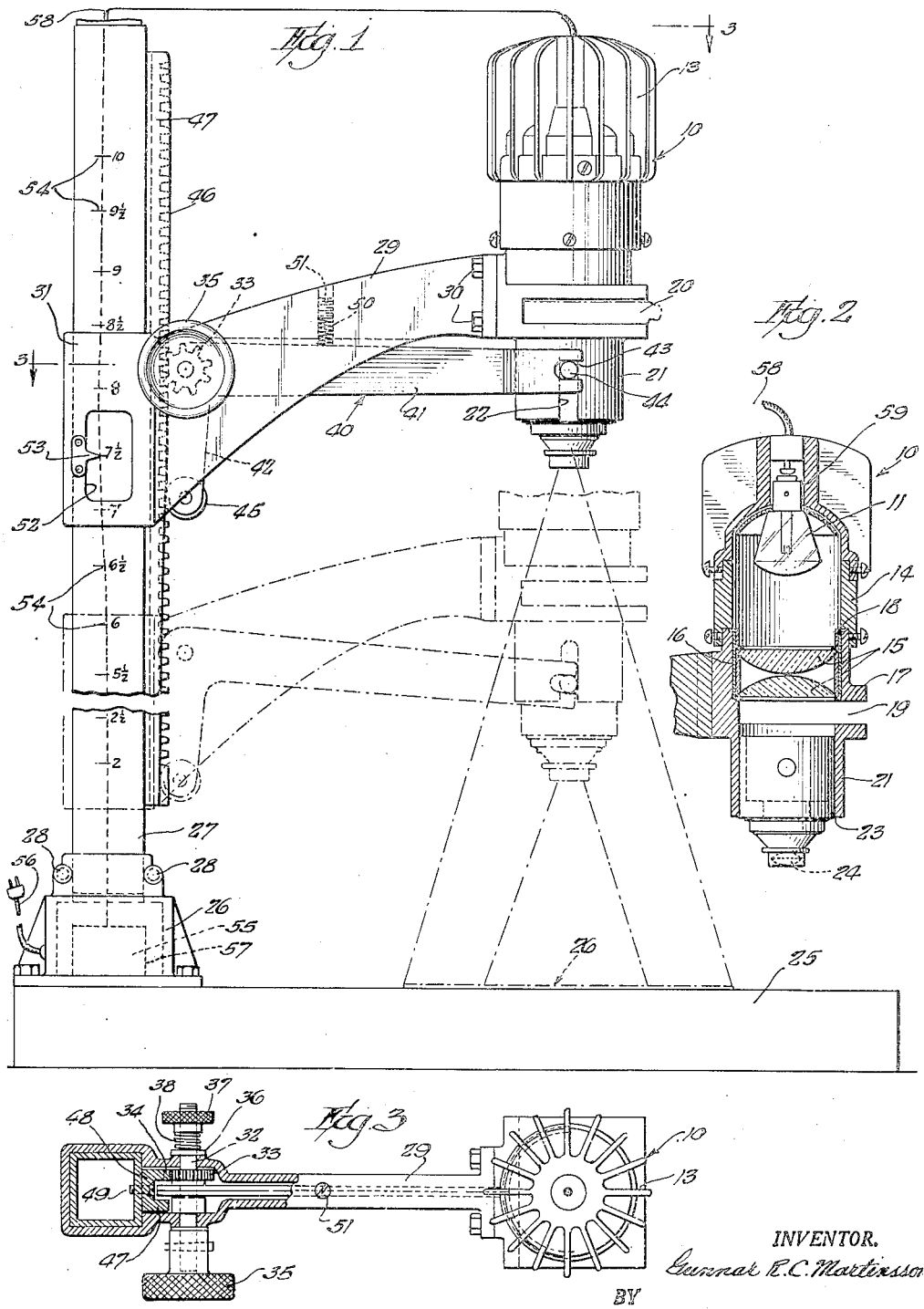
INVENTOR.
Gunnar R. C. Martinsson
BY
Sheridan, Davis & Colgill
Attys.

Patented Mar. 29, 1949

2,465,692

UNITED STATES PATENT OFFICE 2,465,692

AUTOFOCUS PHOTOGRAPHIC ENLARGING APPARATUS

Gunnar R. C. Martinsson, Chicago, Ill.

Application July 11, 1946, Serial No. 682,755

4 Claims. (Cl. 88—24)

This invention relates to improvements in photographic enlarging apparatus.

One object of the invention is to provide improved apparatus for making enlargements from photographic negatives including means for adjusting the apparatus with respect to a positive sheet for selecting the desired size of the enlargement and including also means which automatically maintain an enlarging lens constantly in focus during such adjustments.

Another object of the invention is to provide an improved enlarging apparatus comprising a lamp housing which constitutes means for supporting a conventional negative carrier and which is provided also with an adjustable enlarging lens in association with which improved mechanism maintains the lens in focusing relation with reference to a negative in the carrier in all adjusted positions of the lamp housing.

An additional object of the invention is to provide a vertically adjustable enlarging device comprising a source of light, a negative holder and an enlarging lens, and means for insuring smooth, non-chattering operation of the adjustable device with respect to a supporting standard or column.

Other objects of the invention relate to various features of construction and arrangement of parts which will be apparent from a consideration of the following specification and drawings, wherein:

Fig. 1 is a broken side elevation of photographic enlarging apparatus which is illustrative of the present improvements;

Fig. 2 is a broken sectional view taken on a vertical plane of the combined lamp housing and lens carrier shown in Fig. 1;

Fig. 3 is a top plan view of the apparatus shown in Fig. 1 with a portion thereof shown sectionally along line 3—3 of Fig. 1.

In the drawings a housing, indicated generally by the numeral 10, is shown for housing a suitable electric lamp 11 for supplying the light required for enlarging purposes. As shown the housing 10 is provided with a plurality of heat radiating fins 13 for dissipating the heat generated within the housing by the lamp 11. The housing 10 is shown as being provided with a cylindrical extension 14 which spaces the lamp 11 a proper distance above the pair of condensing lenses 15. The extension 14 may be made as an integral part of the upper portion of the housing 10 if desired. The condensing lenses may conveniently be pre-assembled in a sheet metal casing 16 and thereafter inserted in a casing section 17. As shown in Fig. 2, the casing section 16 is provided with an outwardly turned flange 18 which rests within a rabbet provided on the upper edge of the section 17.

The section 17 is provided with a passage or receiver 19 properly dimensioned for receiving a conventional negative holder 20 which is indicated by dotted lines in Fig. 1. The section 17 is provided with a downwardly extending cylindrical portion 21 having diametrically opposite vertical slots 22. The casing portion 21 constitutes a housing and guide for a cylindrical carrier 23 for an enlarging lens 24 which may be of conventional optical characteristics and need not be further described. The carrier 23, as shown in Figs. 1 and 2, is adapted to be moved vertically within the guide 21 for varying the distance between the lens 24 and a negative in the carrier 20.

The casing 10 including sections 17 and 21 constitute an adjustable unit adapted to be moved vertically toward or away from a suitable support 25 or other surface upon which a positive or a sheet of photographic enlarging paper 26 is adapted to be placed in proper relation beneath the lens 24. In the particular structure illustrated the support 25 constitutes a convenient base upon which the enlarging apparatus may be mounted.

As shown in the drawings there is secured to the base 25 a pedestal-like support 26 provided with a vertical passage therein of a shape and size for receiving a supporting standard 27. The standard 27 is shown as being rectangular in cross-section and hence the passage in pedestal 26 is of similar shape in plan view. The pedestal is provided with clamp screws 28 whereby the upper portion of the pedestal, which at its upper end is provided with opposite slits or kerfs therein (not shown) may be clamped firmly to the lower portion of the standard.

The housing 10 is shiftably attached to the standard 27 by means of a vertically adjustable arm 29. The housing section 17 is shown attached to the forward end of the arm 29 by screws 30. The arm 29 is provided at its opposite end with a sleeve 31 provided with a vertical passage therethrough which is a size and shape for accommodating vertical movement of the sleeve upon the standard 27. For the purpose of shifting the arm 29 vertically in adjusting the lens 24 to the precise position of elevation required in making an enlargement of a predetermined size, a rotatable shaft 32 is journalled in the arm and has mounted thereon a pinion 33 which meshes with a vertical rack 34 secured to the adjacent face of the standard 27. One end of the shaft is provided with a hand wheel or the like 35, by means of which the shaft and pinion may be rotated for causing the bracket or arm 29 to ascend or descend in accordance with the direction of rotation of the wheel. The opposite end of the shaft preferably is provided with a suitable friction device which prevents descent of the arm by gravity and whereby the arm will be retained in any position of vertical adjustment effected by rotation of the wheel 35. The particular friction device shown in Fig. 3 comprises a washer 36 on the shaft and positioned for contact with the adjacent portion of the arm 29. A clamp screw 37 is provided on the adjacent end of the shaft for pressing a spring 38 against the washer for producing sufficient friction again turning the shaft 32 for restraining descent of the arm 29 by gravity. As will be seen, in making a vertical adjustment of the arm 29 by the operation of the wheel 35, the clamp nut 37 may first be loosened if such is required, although the nut may be so adjusted that the friction of the disc 36 against the contacting surface of the arm 29 will be sufficient to retain the arm in adjusted position but will be insufficient to require that the nut 37 be loosened prior to operation of the hand wheel.

As shown in the drawings, the lower portion of the arm 29 is channeled for accommodating a lens adjusting member indicated generally by the numeral 40. The member 40 is shown as a bell-crank lever formed of two metal stampings providing, when the members are secured together by welding or the like, a long arm 41 and a shorter arm 42. The forward end of the arm 41 is bifurcated and extends to opposite sides of the casing section 21. The ends of the bifurcations are provided with horizontal slots 43, each for receiving a stud 44 which projects radially from the lens carrier 23 through one of the vertical slots 22. Inasmuch as the member 40 is pivotally mounted upon the shaft 32 and is therefore movable as a whole with the arm 29, it supports the lens carrier 23 within the casing 31. However, pivotal movement of the lever 40 about the axis of the shaft 32 will effect a vertical shifting of the carrier 23 within the casing section 21 and hence of the enlarging lens 24.

Improved and simplified means are shown herein for effecting such pivotal movement of the member 40 whereby the lens 24 is adjusted correlatively with respect to a negative in a negative carrier 20 whenever the arm 29 is raised or lowered from a given position. The correlative adjustment of the lens 24 above referred to is such as to maintain the lens 24 constantly in focusing relation with respect to a given plane, such as that represented by the photographic sheet 26 of enlarging paper upon the base 25. For effecting such pivotal action of the member 41, the lower end of arm 42 is shown as bifurcated for supporting a roller 45 or other cam follower which is arranged for contact with the adjacent cam surface 46 of a vertically arranged cam 47.

The cam member 47, as shown in Fig. 3, preferably constitutes one flange of a channel shaped member indicated generally by the numeral 48 which may be secured by screws 49 or the like, to the adjacent wall of the standard 27. The opposite flange of the member 48 constitutes the rack bar 34 above described. The cam surface 46 is generated accurately for effecting a predetermined pivotal movement of the lens adjusting member 40 through a predetermined arc upon movement of the arm 29 vertically through a given distance. The extent of pivotal movement of the member 40 during the movement of the arm 29 from one vertical position to another is such as to effect relative movement of the lens 24 with reference to a negative in the carrier 20 for maintaining the lens in constant focus upon a plane represented by the sheet 26. As shown in Fig. 1, a helical spring 50 is provided within a cylindrical bore in the arm 29 for contacting the upper portion of the member 40 and is placed under compression by an adjusting screw 51 within the bore. The spring 50 thus maintains the roller 45 constantly in contact with the cam surface 46 for insuring proper focal adjustment of the lens in all positions of elevation of the arm 29.

The spring 50 and adjusting screw 51 performs an additional important function also in that they cooperate not only to insure proper contact of the follower 45 with the surface of the cam 46 but the upward component exerted by the spring is such as to neutralize the tendency of the sleeve or slide 31 to bind upon the standard 27 resulting from the weight of and the load supported by the laterally extending arm 29. Assuming that the spring 50 is of approximate stiffness, the screw 51 is adusted to insure that the sleeve 31 will slide smoothly without chatter or vibration along the standard as the level of the arm 29 is raised or lowered to a position affording an enlargement of the desired ratio.

The base 26 being hollow provides a casing for a transformer where such is desirable, as where a low voltage lamp is employed as a source of light for enlarging purposes. The transformer is indicated by dotted lines at 55, the primary of which is supplied from a cord 56 that may be plugged into a convenient outlet of a 110 v. line, for example. One of the output conductors of the transformer may be grounded to the casing 26 at 57 while the other output conductor 58 extends upwardly through the bottom column 27 to the lamp 11, the other terminal of the lamp being grounded to the lamp casing at 59.

The sleeve 31 is shown as provided with a sight opening 52 and an indicator 53 properly positioned with reference to graduations 54 provided on the adjacent face of the standard 27 for indicating in any given position of vertical adjustment of the arm 29 the ratio of enlargement afforded by the lens 24 by reason of such adjustment of the arm 29. Hence an operator desiring to produce an enlargement having a certain size-relation to the negative, adjusts the arm 29 along the standard 27 until the pointer 52 registers with the graduation that indicates the ratio of enlargement desired. From the foregoing it will be seen that the improvements provide means for maintaining an enlarging lens constantly in focusing relation with reference to a positive sheet as the negative is moved toward or away from the sheet and that the apparatus can be adjusted readily for giving the ration of enlargement desired.

While I have shown and described a structure that is illustrative of the improvements, it will be apparent that various changes in details may be resorted to without departure from the spirit of the invention.

I claim:

1. A photographic enlarger comprising a vertical standard, a vertical rack on the exterior of said standard, a bracket extending laterally from the standard and provided with a sleeve slidably embracing the standard, a pinion journalled in the bracket in mesh with the rack, manual means for operating the pinion for shifting the bracket vertically, a negative receiving housing carried by the bracket, an enlarging lens provided with an adjustable carrier positioned beneath a negative in said housing, a lever pivoted to the bracket and provided with an arm engaging said lens-carrier and an actuating arm provided with a cam follower, an elongated stationary cam on said bracket engaged by said follower for effecting pivotal movement of said lever in directions for adjusting said lens carrier relative to a negative in said receiver for maintaining the lens constantly in focusing relation with respect to the negative and a given plane beneath said lens as the negative is moved toward or away from said plane upon operation of said manual means, spring biasing means acting between said lever and said bracket effective to urge said cam follower into camming engagement with said elongated stationary cam.

2. In photographic enlarging apparatus provided with a lamp and negative housing adjustable vertically with respect to a given focal plane of a lens, a lens adjustable with respect to a negative in the housing for forming an image of the negative at said plane, a vertical standard, a bracket slidable along the standard and supporting said housing, biasing means acting in one direction on said bracket for relieving said bracket from a tendency to bind with respect to said standard resulting from the moment imposed on the bracket by its weight and by the weight of the housing supported thereby, a bell-crank lever pivoted to said bracket and having an arm supporting said lens and a second arm extending along said standard and provided with a cam follower, and an elongated cam on said standard engaged by said follower for effecting swinging movement of said lever in directions for constantly maintaining said lens in focusing position with respect to a negative in said housing and to said focal plane as said housing is moved in either direction for adjusting the negative in a selected position of enlargement, said biasing means for said bracket being effective to exert a reaction on said follower to urge the latter into engagement with said elongated cam.

3. In photographic enlarging apparatus, a movable support comprising a slide and a laterally extending bracket for supporting a light source and a negative holder, a shiftable enlarging lens for focusing a projected image of a negative in a holder upon a given plane, a vertical column along which said slide is movable for altering the elevation of said bracket, a lever pivotally secured to said movable support and provided with an arm supporting said lens, a second lever arm arranged for control by a cam, a cam disposed along said face of said column for effecting control of said second arm for maintaining said lens constantly in focusing relation with respect to the negative and to said given plane, and biasing means acting between said lever and said bracket for maintaining said second arm in cam contacting relation and for relieving said slide from binding engagement with said column as said movable support is shifted along said column.

4. Photographic enlarging apparatus comprising a vertical standard provided with an elongated cam along one side thereof, a movable member comprising a slide shiftable along the column and a laterally extending bracket for supporting a lamp casing at the end remote from the slide, a lever pivotally secured to said movable member comprising an arm adjustably supporting an enlarging lens and a second actuating arm arranged for cooperative contact with said cam for maintaining the enlarging lens in focusing relation with respect to a given plane as the movable member is shifted vertically along said standard, and biasing means acting in one direction on said lever for maintaining said second arm in cooperative relation with respect to said cam and acting in the opposite direction on said bracket for relieving said slide from the tendency to bind on said column resulting from the moment imposed on the slide by the weight of the laterally extending bracket and the lamp casing supported thereby.

GUNNAR R. C. MARTINSSON.

REFERENCES CITED

The following references are of record in the file of this patent:

UNITED STATES PATENTS

| Number | Name | Date |
|---|---|---|
| 1,573,314 | Goldberg | Feb. 16, 1926 |
| 2,194,384 | Dewey | Mar. 19, 1940 |
| 2,298,741 | Lazna | Oct. 13, 1942 |
| 2,380,818 | Young-Berg | July 31, 1945 |